(12) United States Patent
Moon et al.

(10) Patent No.: US 7,510,791 B2
(45) Date of Patent: Mar. 31, 2009

(54) BATTERY PACK OF IMPROVED STRUCTURE

(75) Inventors: Ki eob Moon, Seoul (KR); Chun kil Jung, Seoul (KR); Yoon Sang Kook, Gwacheon-si (KR); Dong Youl Suk, Suwon-si (KR)

(73) Assignee: LG Chem, Ltd. (KR)

( * ) Notice: Subject to any disclaimer, the term of this patent is extended or adjusted under 35 U.S.C. 154(b) by 687 days.

(21) Appl. No.: 11/054,444

(22) Filed: Feb. 9, 2005

(65) Prior Publication Data

US 2005/0208346 A1    Sep. 22, 2005

(30) Foreign Application Priority Data

Feb. 13, 2004    (KR) .................. 10-2004-0009502

(51) Int. Cl.
| H01M 14/00 | (2006.01) |
| H01M 2/00 | (2006.01) |
| H01M 2/08 | (2006.01) |
| H01M 2/04 | (2006.01) |

(52) U.S. Cl. ................. 429/7; 429/163; 429/175; 429/176

(58) Field of Classification Search .......... 24/587.12, 24/596.1, 591.1, 554.1, 584.1, 68 PP, 455, 24/471; 429/7
See application file for complete search history.

(56) References Cited

U.S. PATENT DOCUMENTS

| 2,710,887 | A | * | 6/1955 | Gelardin .................. 429/172 |
| 3,632,449 | A | * | 1/1972 | Yardney et al. ............ 429/13 |
| 4,392,009 | A | * | 7/1983 | Napoli .................... 136/251 |
| 5,798,906 | A | * | 8/1998 | Ando et al. ............... 361/520 |
| 7,297,440 | B2 | * | 11/2007 | Watanabe et al. .......... 429/163 |
| 2002/0142195 | A1 | * | 10/2002 | Ehara ........................ 429/7 |
| 2003/0108786 | A1 | * | 6/2003 | Aaltonen et al. ............ 429/61 |
| 2004/0033416 | A1 | * | 2/2004 | Kim et al. .................. 429/175 |

(Continued)

FOREIGN PATENT DOCUMENTS

JP    2002-231201    *    8/2002

(Continued)

OTHER PUBLICATIONS

Certified English translation of JP 2003-308881.*

(Continued)

*Primary Examiner*—Dah-Wei D Yuan
*Assistant Examiner*—Maria J Laios
(74) *Attorney, Agent, or Firm*—Cantor & Colburn LLP

(57) ABSTRACT

A battery pack comprising a battery cell having electrode terminals formed on an upper surface of the battery cell, and a protective circuit module (PCM) block mounted on the battery cell, wherein one or more connecting holes for electrical connection between the battery cell and the PCM block are perforated through the PCM block such that a connecting portion between the battery cell and the PCM block is exposed to the outside of the upper surface of the battery cell. The battery pack is lighter, compacter and miniaturized, thereby allowing an electronic device employing the battery pack to be reduced in an overall size, enhancing workability through a simplified assembling process, reducing manufacturing costs through reduction of the number of components, and enhancing productivity through reduction of the number of operating steps by eliminating additional installation steps.

10 Claims, 13 Drawing Sheets battery cell A : 209
PCM block B : 202, 203, 204, 207
finishing member C : 201, 210, 211, 212, 214

U.S. PATENT DOCUMENTS

2004/0091769 A1 * 5/2004 Kawabata et al. ............ 429/163
2005/0112456 A1 * 5/2005 Kozu et al. .................... 429/62
2005/0123824 A1 * 6/2005 Ishikawa et al. .............. 429/94

FOREIGN PATENT DOCUMENTS

| JP | 2003-308881 | * | 10/2003 |
| WO | WO 03/69697 | * | 8/2003 |
| WO | WO 03/77346 | * | 9/2003 |

OTHER PUBLICATIONS

IPDL Machine translation of JP 2002-231201.*

* cited by examiner

Prior Art

213 battery cell A : 209
PCM block B : 202, 203, 204, 207
finishing member C : 201, 210, 211, 212, 214 battery cell A : 209

PCM block B : 202, 203, 204, 207 finishing member C : 201, 210, 211, 212, 214 battery cell A : 209

PCM block B : 202, 203, 204, 207 finishing member C : 201, 202a, 210, 211, 212, 214, 216, 217, 218 battery cell A : 209

PCM block B : 202, 203, 204, 207 finishing member C : 201, 202a, 210, 211, 212, 214, 216, 217, 218 battery cell A : 209
PCM block B : 202, 203, 204, 207
finishing member C : 201, 210, 211, 212, 214, 216, 217 bimetal block D : 205, 206, 208a

BATTERY PACK OF IMPROVED STRUCTURE

FIELD OF THE INVENTION

The present invention relates to a battery pack having an improved structure, and, more particularly, to a battery pack, which comprises a battery cell having electrode terminals formed on an upper surface thereof, and a protective circuit module (PCM) block mounted on the battery cell, in which at least one connecting hole for electrically connecting the battery cell and the PCM block is perforated through the PCM block such that a joined portion of the battery cell and the PCM block is exposed to the outside of the upper surface.

BACKGROUND OF THE INVENTION

A rechargeable secondary battery is generally classified into hard pack batteries and internal batteries. FIG. 1 shows an exploded perspective view of a mobile telecommunication terminal with a conventional internal battery separated from the terminal.

Referring to FIG. 1, the mobile telecommunication terminal with the conventional internal battery comprises a body 100, a battery receiving part 110, a battery pack 120, and a battery cover 130, in which the battery pack 120 is mounted in the body 100 so as to be enclosed by the body 100 and the battery cover 130. For the hard pack battery, the battery pack is provided as a hard pack, and is detachably mounted on a rear side of the body, so that the battery pack is exposed to the outside. On the other hand, the mobile telecommunication terminal as shown in FIG. 1 is provided with the internal battery in which a board having a battery cell and a protective circuit board mounted thereon is received in an external case. In such an internal battery pack, as an approach for holding the battery cell and the protective circuit board, although it has been conventional that the battery cell and the protective circuit board are only received within the external case comprising an upper cover and a lower cover, a manner of filling a low temperature molding resin between the battery cell and the protective circuit board or a manner of coating the battery cell with the low temperature resin and encasing it with a resinous mold has been recently developed for the purpose of reducing the number of components while enhancing the productivity.

Additionally, for the purpose of miniaturization of the battery pack, instead of providing external input and output terminals for connecting the battery pack and external circuits as a terminal block or a lid wire on an outer surface of the battery pack, the external input and output terminals are formed on one side of the protective circuit substrate to be exposed to the outside.

In this case, when manufacturing the battery pack, it is necessary to secure an accurate position of the external input and output terminals relative to the external case or the resinous mold, and for this purpose, the protective circuit substrate must be accurately fixed at a predetermined position to the battery cell when filling the low temperature molding resin. Conventionally, molding is performed in a state wherein the protective circuit substrate is fixed at the predetermined position to the battery cell by inserting a resinous holder between the protective circuit substrate and the battery cell before filling the resin.

However, according to this approach, the resinous holder impedes flow of the resin when filling the resin, thereby causing deterioration of the flow of the resin. As such, when suffering deterioration of the resin during such a molding process, cracks or pin holes are formed inside or outside of the resinous mold of the battery pack, thereby providing insufficient airtightness between the protective circuit substrate and the battery cell which must be sealed by the resinous mold, or providing insufficient strength of the resinous mold, resulting in reduction of the yields.

Meanwhile, although flow of the resin can be prevented from being deteriorated by decreasing a filling speed of the resin or increasing a temperature and a filling pressure of the resin upon filling the resin, there occur other problems, such as reduction in productivity, damage to the battery cell or the protective circuit substrate caused by the heat or the pressure, and the like. Additionally, when using a resin having a lower viscosity, although the deterioration in the flow of the resin can be suppressed, such a material has not been yet provided, which has a low viscosity upon being filled into the mold, while having a sufficient mechanical strength as the resin mold of completed products.

FIGS. 2 to 4 are perspective views of various types of conventional internal battery pack, showing a hard case type internal battery pack, an insert molding type internal battery pack, and a double internal battery pack which adopts aspects of the hard case type battery pack and the insert molding type battery pack.

Various methods for manufacturing the battery pack as mentioned above have been suggested. According to one of the methods, a battery cell holding support and a substrate holding support are inserted into a mold so as to provide a space between the battery cell holding support and the substrate holding support therein, and molding is performed after the space is filled with a molding material within the mold in which a battery cell is supported by the battery cell holding support, and at the same time, a substrate for external input and output terminals is supported by the substrate holding support. According to another method, after encasing an overall protective circuit module (PCM) with a resin in a state of anode and cathode nickel plates being perpendicularly attached thereto, an encased portion of the PCM is joined to a battery cell at both sides thereof by spot welding, in which a bimetal and the nickel plate are perpendicularly attached to a cathode terminal of the battery cell while the other nickel plate is perpendicularly attached to an anode terminal of the battery cell. According to the other method, after a battery cell and a PCM are attached to an injection-molded case, a soft pack is inserted. However, the conventional battery packs have various difficulties in manufacturing.

SUMMARY OF THE INVENTION

Therefore, the present invention has been made in view of the above problems, and it is an object of the present invention to provide a battery pack, designed to be lighter, compacter and miniaturized, thereby allowing an electronic device employing the battery pack to be reduced in overall size, enhancing workability through a simplified assembling process, reducing manufacturing costs through reduction of the number of components, and enhancing productivity through reduction of the number of operating steps by eliminating additional installation steps.

In accordance with one aspect of the present invention, the above and other objects can be accomplished by the provision of a battery pack comprising a battery cell having electrode terminals formed on an upper surface of the battery cell, and a protective circuit module (PCM) block mounted on the battery cell, wherein one or more connecting holes for electrical connection between the battery cell and the PCM block are perforated through the PCM block such that a joined portion between the battery cell and the PCM block is exposed to the outside of the upper surface of the battery cell.

According to the present invention, the electrical connection between the battery cell and the PCM block can be easily performed through the connecting hole perforated through the PCM block, thereby providing various advantages as described above.

The battery cell is a secondary cell, which hermetically receives an electrode assembly comprising a cathode, an anode and a separator, and is filled with an electrolyte. Preferably, the battery cell is a lithium ion secondary cell.

The PCM block acts to prevent overcharge, over-discharge, over-current and the like of the battery cell through detection for a condition of the battery cell. The PCM block may comprise a PCM assembly having a protective circuit formed thereon to provide a function of preventing overcharge, over-discharge and over-current of the battery cell; a cap housing surrounding the PCM assembly to hold the PCM assembly therein; and electrode leads attached to the PCM assembly while being electrically connected to electrode terminals of the battery cell. In this construction, the electrode leads are connected to a lower surface of the PCM assembly to provide the electrically connected portion between the battery cell and the PCM block, and the connecting hole is perforated through the PCM assembly and the cap housing of the PCM block such that the electrode leads are exposed to the outside of an upper surface of the cap housing. The PCM assembly is provided on an upper surface with external input and output terminals, and the cap housing is provided with a window for terminals such that the external input and output terminals can be exposed to the outside of the upper surface through the window. The electrode leads are not limited to any particular construction so long as the PCM assembly can be electrically connected to the battery cell through the electrode leads in a state of being attached to the PCM assembly. Preferably, a well-known nickel plate may be used for the electrode leads.

The electrical connection between the battery cell and the PCM block may be achieved by various methods, such as spot welding, laser welding, soldering, and the like. Most preferably, spot welding or laser welding may be performed for the electrical connection between the battery cell and the PCM block.

After the electrical connection between the battery cell and the PCM block through the connecting hole, an insulating member is inserted into or attached to the connecting hole to protect the electrically connected portion from moisture, electrically conductive foreign substances, and the like. The insulating member is not restricted to any particular shape or material, so long as it can provide its functions. For example, the insulating member may be a stopper inserted into the connecting hole or a film attached to a mouth of the connecting hole.

The battery pack of the invention may be preferably applied to, in particular, to an internal battery pack, and may be preferably applied as a power source for a mobile device, such as a telecommunication terminal.

As for a preferred embodiment of the invention, a battery pack may be detachably mounted into a mobile telecommunication terminal and supply a rated operating voltage to the terminal, the battery pack comprising: a battery cell A having cathode and anode terminals formed on an upper surface to supply the rated operating voltage; a PCM block B comprising a PCM assembly electrically connected to the battery cell A and including a protective circuit module, a cap housing formed by injection molding to hold the PCM assembly therein, and cathode and anode nickel plates attached to the PCM assembly; at least one connecting hole perforated through one or both of the PCM assembly and the cap housing in order to join the PCM block B to the upper surface of the battery cell A by spot welding; and a finishing member C for securing air-tightness between inner structures of the battery pack by firmly fixing the battery cell A and the PCM block B while allowing easy coupling of the battery cell A and the PCM block B. At this time, the connecting hole perforated through the PCM assembly and the cap housing may be exposed to the outside of the upper surface of the battery cell after assembly, and allow the PCM block to be directly welded to the battery cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
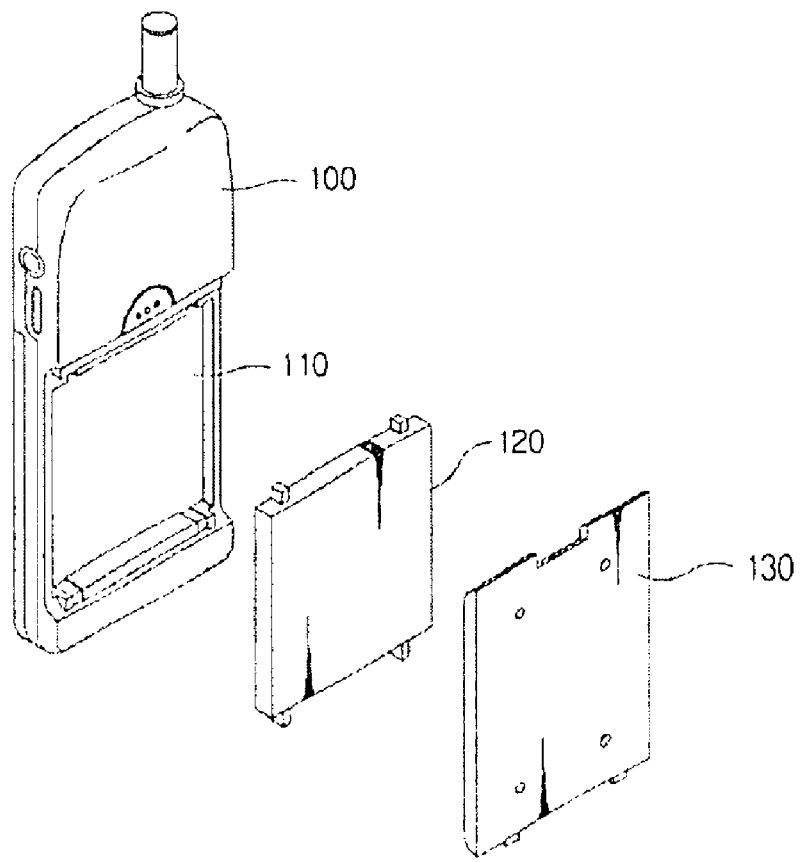
FIG. 1 is an exploded perspective view of a conventional internal battery pack disassembled from a telecommunication terminal.
Figure 2:
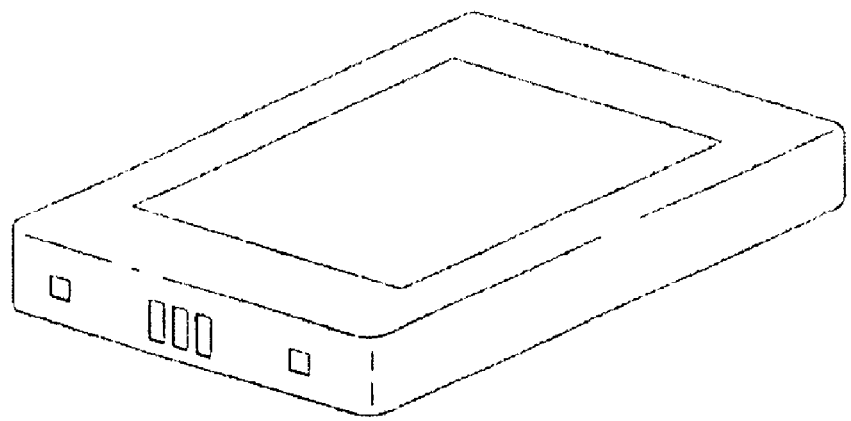
FIGS. 2 to 4 are perspective views of different types of conventional internal battery pack.
Figure 3:
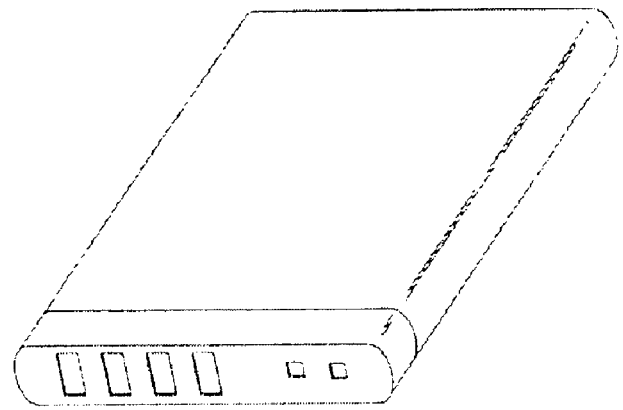
Figure 4:
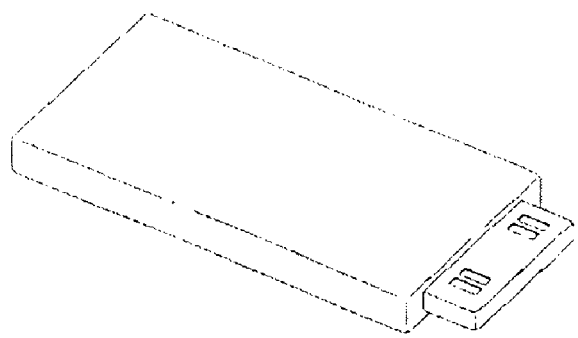

Preferred embodiments of the invention will now be described with reference to the drawings, in which the same reference numerals indicate the same components throughout. It should be noted that the embodiments are disclosed for the purpose of illustration, and do no limit the scope of the present invention.

FIGS. 5 to 11 are perspective views illustrating internal battery packs according to first, second and third embodiments of the invention, in which the internal battery packs of each embodiment are subdivided into two types according to the number of connecting holes 213 (see FIG. 16) formed on a PCM block. That is, the PCM block of the internal battery pack may have one connecting hole 213 formed on one side of the upper surface thereof so as to be exposed to the outside, or two connecting holes formed at both sides of the upper surface thereof so as to be exposed to the outside (the phrase "exposed to the outside" means that after assembly, each connecting hole 213 (see FIG. 16) is exposed to the outside).

Figure 5:
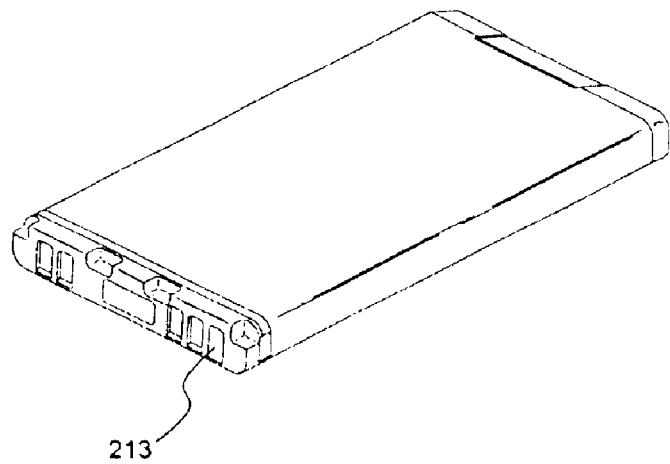
FIGS. 5 and 6 are perspective views of a label type battery pack according to a first embodiment of the present invention.
Figure 6:
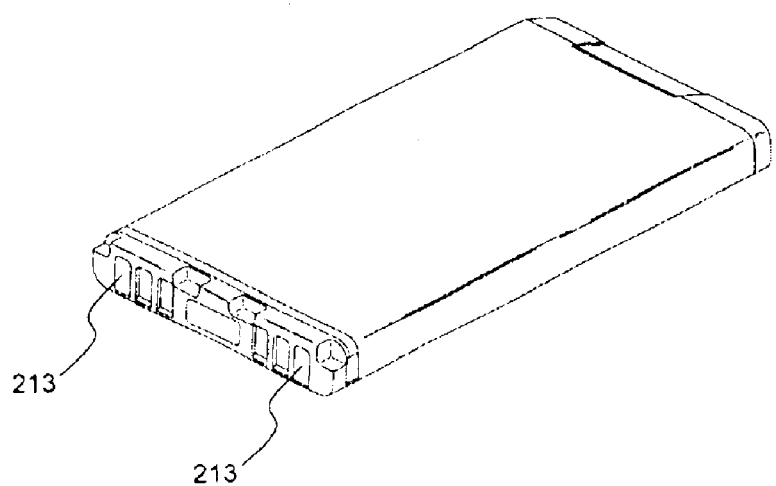

FIGS. 5 and 6 are perspective views of a label type battery pack according to the first embodiment of the invention, in which FIG. 5 shows the internal battery pack having one connecting hole 213, and FIG. 6 shows the internal battery pack having two connecting holes 213.

The label type battery pack according to the first embodiment of the invention is constructed by injection molding a PCM assembly 203, and then joining the PCM assembly 203 to a battery cell A using a nickel plate 206 by means of spot welding. Since the battery cell is not formed by means of injection molding, the label type battery pack of the first embodiment has an advantage of ensuring a reliability of the battery cell A. More detailed construction thereof will be described below with reference to FIGS. 16 and 17.

Figure 7:
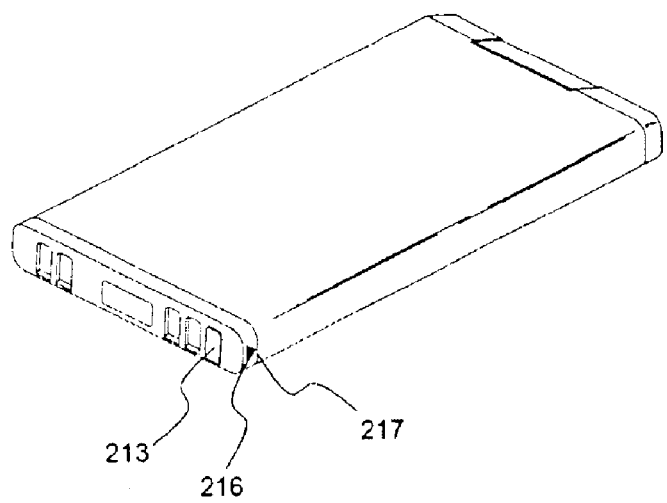
FIGS. 7 to 9 are perspective views of a modified battery cell type battery pack according to a second embodiment of the present invention.
Figure 8:
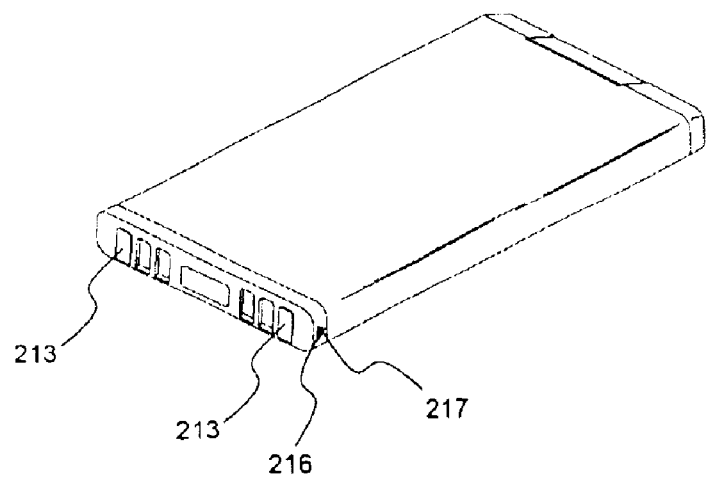
Figure 9:
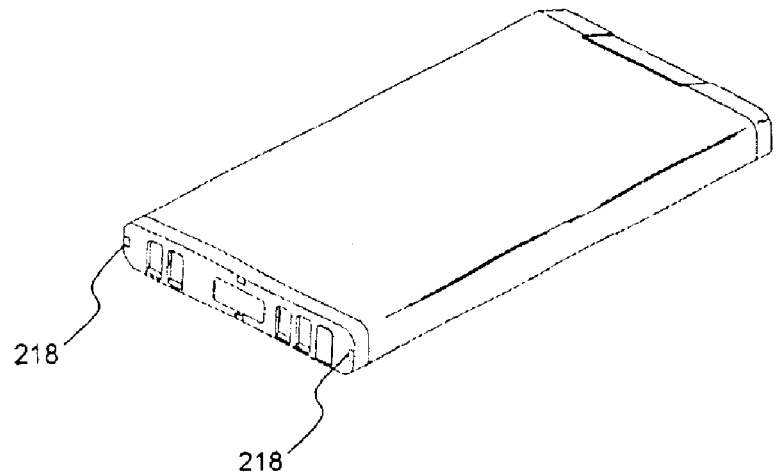

FIGS. 7 to 9 are perspective views of a modified battery cell type battery pack according to the second embodiment of the invention. FIGS. 7 and 8 show the modified cell type battery pack using lockers 216 and locker grooves 217, in which FIG. 7 shows the battery pack having one connecting hole 213, and FIG. 8 shows the battery pack having two connecting holes 213. FIG. 9 shows the battery pack using a clamper 218.

The modified battery cell type battery pack according to the second embodiment of the invention comprises a battery cell A which is provided with an aluminum top can protruded a predetermined length from an upper surface of the battery cell A having cathode and anode terminals formed thereon, and a PCM block B which is inserted into the top can and is then fixed to the battery cell A by means of the lockers 216 and the locker grooves 217 or the clamper 218. More detailed construction thereof will be described below with reference to FIGS. 18 and 19.

Figure 10:
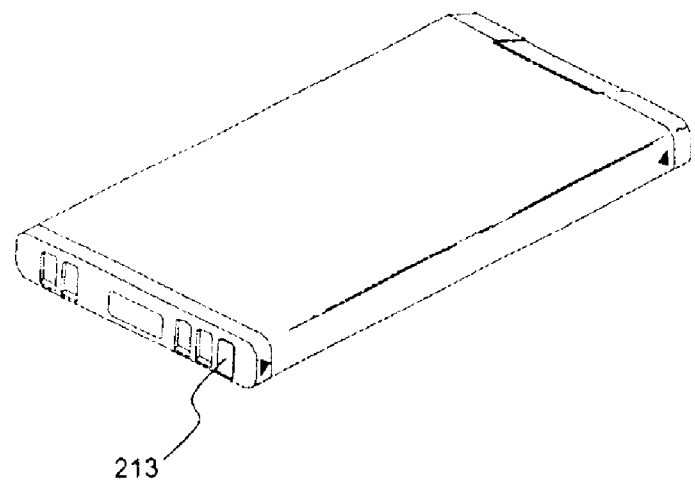
FIGS. 10 and 11 are perspective views of a case insertion type battery pack according to a third embodiment of the present invention.
Figure 11:
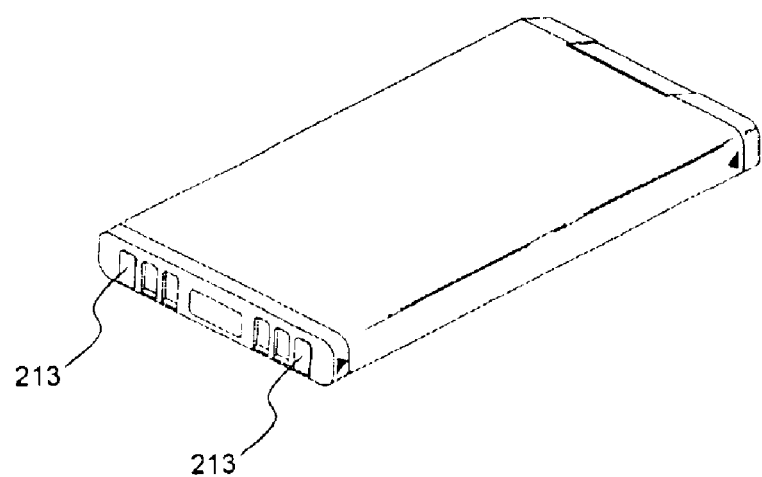
Figure 12:
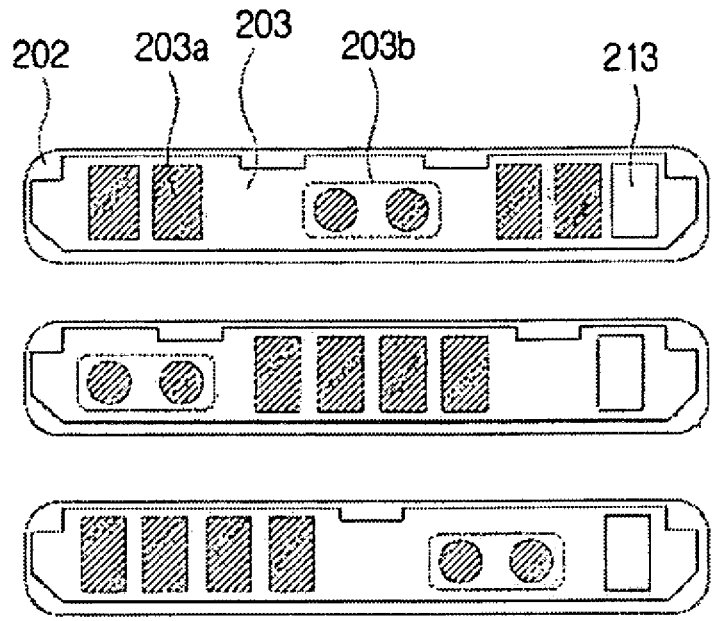
FIGS. 12 to 15 are bottom views of a PCM block according to a position of a connecting hole of the present invention.
Figure 13:
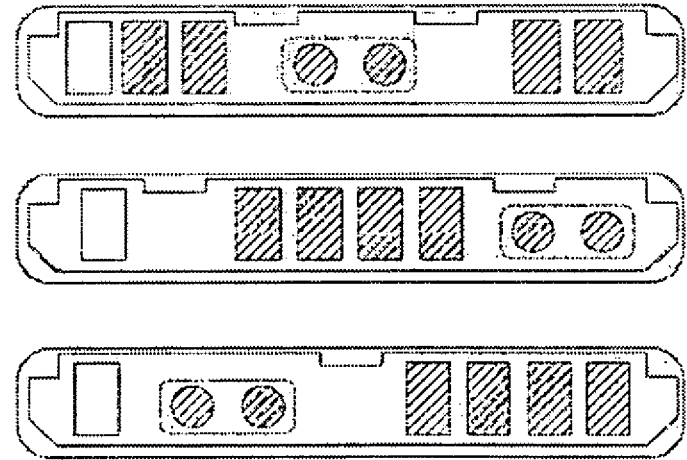
Figure 14:
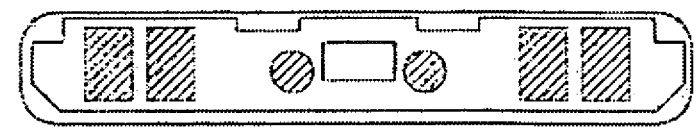
Figure 15:
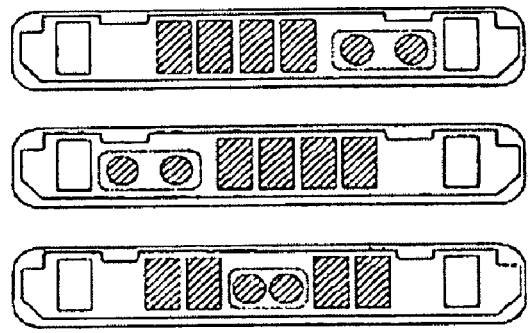

FIGS. 10 and 11 are perspective views of a case insertion type battery pack according to the third embodiment of the invention, in which FIG. 10 shows the internal battery pack having one connecting hole 213, and FIG. 11 shows the internal battery pack having two connecting holes 213.

The case insertion type battery pack according to the third embodiment of the invention is constructed such that after attaching a PCM block B having an injection molded PCM assembly 203 to a battery cell A, the PCM block B attached to the battery cell A is inserted into a case 400 so as to penetrate the case 400, and is then fixed by lockers 216. More detailed construction thereof will be described below with reference to FIGS. 20 and 21.

FIGS. 12 to 15 are bottom views of the PCM block according to a position of the connecting hole of the invention, showing a case where the connecting hole 213 is located at the right on the PCM block, a case where the connecting hole 213 is located at the left on the PCM block, a case where the connecting hole 213 is located at the center on the PCM block, and a case where the connecting holes 213 are located at both sides on the PCM block, respectively. As shown in FIGS. 12 to 15, the injection molded PCM block B comprises a cap housing 202, and the PCM assembly 203, on which external input and output terminals 203a, a test point 203b, and the connecting hole 213 are formed.

Figure 16:
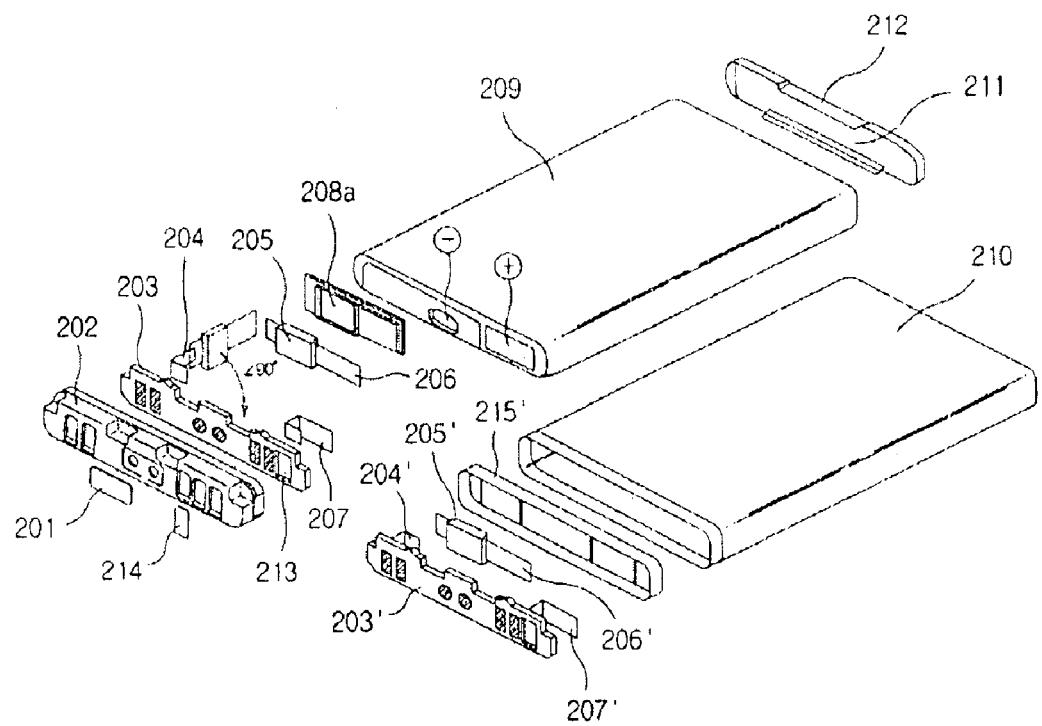
FIGS. 16 and 17 are exploded perspective views of the label type battery pack according to the first embodiment of the invention.
Figure 17:
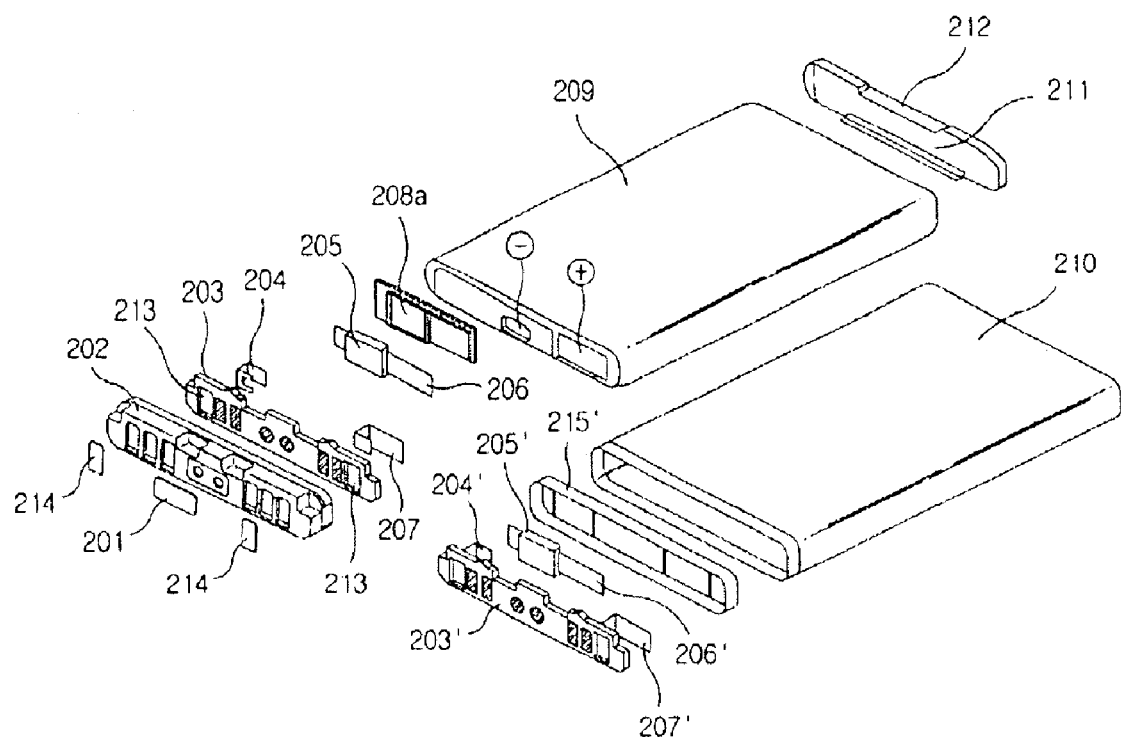

FIGS. 16 and 17 are exploded perspective views of the label type battery pack according to the first embodiment of the invention, in which FIG. 16 shows the internal battery pack having the one connecting hole 213, and FIG. 17 shows the internal battery pack having the two connecting holes 213.

The battery pack according to the first embodiment of the invention comprises the battery cell A, the PCM block B, a finishing member C, a bimetal block D, the connecting hole 213, and the like. These components are referred to for convenience of description, and reference numerals including a ' mark on an upper portion of the numerals, such as 203', 204' and the like, will be used for indicating components which are formed to the PCM block by partial insert molding. With regard to this, FIGS. 22 to 30 show two types of manufacturing process, that is, an overall insert molding process and a partial insert molding process, which will be described below.

Figure 18:
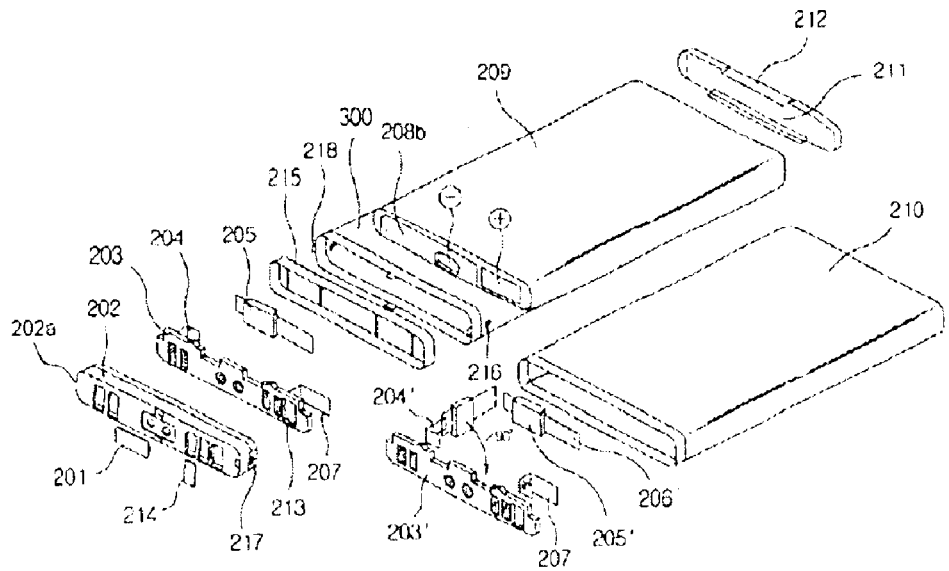
FIGS. 18 and 19 are perspective views of the modified battery cell type battery pack according to the second embodiment of the invention.

The battery cell A comprises a lithium ion cell 209 having a cathode terminal and an anode terminal formed on an upper surface thereof to supply a rated operating voltage, and a bimetal block case guide 208a installed on the upper surface of the lithium ion cell 209 for electrical insulation between the battery cell A and a bimetal 205, which will be joined to the lithium ion cell 209 by spot welding. The cathode terminal of the battery cell A may be an aluminum-nickel clad plate joined to an external can made of aluminum, and the anode terminal of the battery cell A may be formed as a protruded terminal. Instead of the bimetal block case guide 208a, an insulating sheet 208b may be bonded around the cathode and anode terminals for electrical insulation from the external can (FIG. 18).

The PCM block B comprises the PCM assembly 203 for preventing overcharge, over-discharge, over-current and the like by detection of the conditions of the lithium ion cell 209 and control of charge or discharge of the lithium ion cell 209, a cap housing 202 formed by injection molding to house the PCM assembly 203 therein, and cathode and anode nickel plates 207 and 204 attached to the PCM assembly 203. The PCM assembly 203 is a rectangular printed circuit board (PCB) having a size approximately the same as that of the upper surface of the lithium ion cell 209. The PCM assembly 203 has a protective circuit module and electrode leads (connection leads) provided at a rear side thereof opposite to the upper surface of the lithium ion cell 209, and the external input and output terminals provided at a front side thereof. The protective circuit module is provided with a protective circuit for protecting the cell from overcharge, over-discharge and over-current upon charging or discharging the battery cell, a surface mounted PCT or the bimetal.

The battery cell A and the PCM block B are joined to each other through the connecting hole 213 exposed to the outside of the upper side after assembly, for example, by spot welding. With regard to this, the connecting hole 213 is perforated through one or both of the PCM assembly 203 and the cap housing 202 in order to join the battery cell A and the PCM block B on the upper surface by direct spot welding.

The finishing member C is a member for securing airtightness between inner structures of the battery pack by firmly fixing the PCM block B to the battery cell A while allowing easy coupling between the components. The finishing member C comprises a test point label 201 attached to one side of the PCM block B, a lower cover 212 for covering a lower surface of the lithium ion cell 209, a double-sided tape 211 attached to an inner surface of the lower cover 212, a connecting hole cover 214 for covering the connecting hole 213, and a wrap label 210 for wrapping an outer periphery of the lithium ion cell 209.

Figure 22:
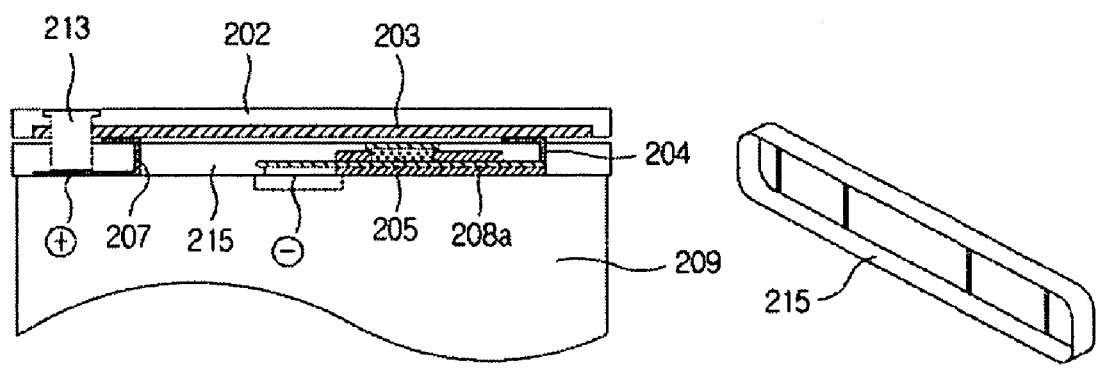
FIGS. 22 to 26 are diagrams illustrating an exemplary construction of a cap housing having one connecting hole.
Figure 26:
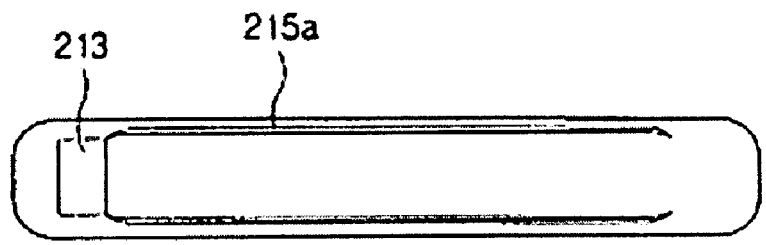
Figure 27:
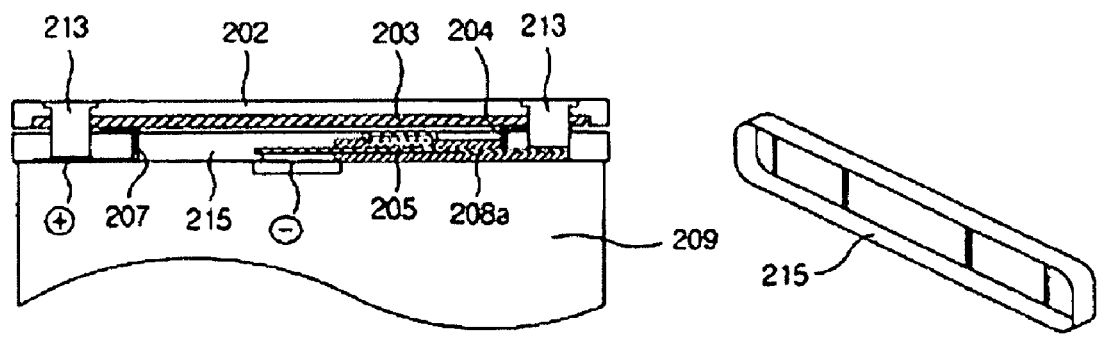
FIGS. 27 to 31 are diagrams illustrating an exemplary construction of the cap housing having two connecting holes.

With the cathode and anode nickel plates 207 and 204 attached to the PCM assembly 203 in a surface mounted device type, for example, by soldering or spot welding, the PCM block B may be formed through the partial insert molding process or the overall insert molding process for encasing the PCM assembly 203 (see FIGS. 22 and 27 for a detailed description of the molding process). The PCM block B is joined to the cathode and anode terminals formed on the upper surface of the lithium ion cell 209 via the bimetal 205 and nickel plate 206 extended from the bimetal 205. During the process of forming the PCM block B, the PCM assembly 203 may be encased within a resin by partial insert molding or overall insert molding. In the case of partial insert molding for encasing the PCM assembly 203 with the resin, for example, a PCM guide 215 is inserted between the PCM assembly 203 and the battery cell A in order to prevent the PCM assembly 203 from being pushed in a direction of the battery cell A. The PCM guide 215 is a spacer made of a clad metal, and is formed therein with bond line grooves 215a (FIG. 26) spaced a predetermined distance from each other from an outer line thereof for injecting adhesives therethrough upon fixing.

A process for assembling the label type battery pack according to the first embodiment may comprise, for example, the steps of: inspecting the battery cell A; attaching the insulating sheet 208b or the bimetal block case guide 208a to the upper surface of the battery cell A by use of adhesives; spot welding the bimetal 205 to the anode nickel plate 204 of the PCM block B comprising the cap housing 202, the PCM assembly 203, the anode nickel plate 204 and the cathode nickel plate 207 (in the case of partial insert molding for encasing the PCM assembly 203, spot welding is performed after inserting the PCM guide made of the clad metal between the PCM assembly 203 and the cap housing 202); seating the anode nickel plate 204 on the battery cell A with a bent portion of the anode nickel plate 204 folded at the right angle, followed by injecting the adhesives through the connecting hole 213 of the PCM block B; spot welding the cathode nickel plate 207 to the cathode terminal of the battery cell A through the connecting hole 213; inspecting electrical properties of a portion where the PCM block B and the battery cell A are joined to each other by spot welding; performing primary inspection of the appearance of the battery pack; attaching the lower cover 212 to the lower surface of the battery cell A by use of the double-sided tape attached to an inner surface of the lower cover 212; attaching the test point label 201 and the connecting hole cover 214 to the upper surface of the PCM block B; and performing final inspection of the appearance of the battery pack, followed by packaging.

Figure 19:
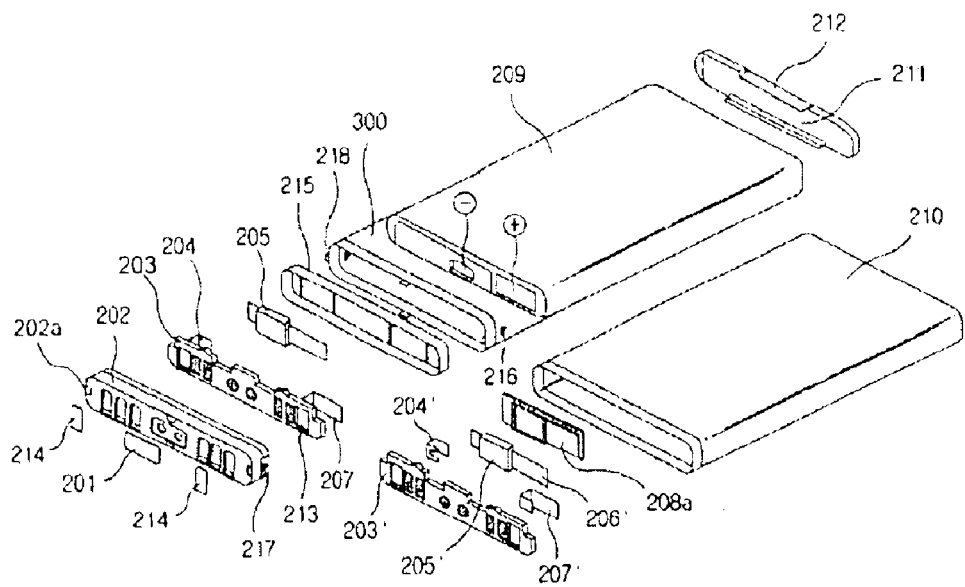

FIGS. 18 and 19 are perspective views of the modified battery cell type battery pack according to the second embodiment of the invention, in which FIG. 18 shows the internal battery pack having the one connecting hole 213, and FIG. 19 shows the internal battery pack having the two connecting holes 213.

A battery cell A comprising a lithium ion cell 209 has a structure modified from a basic structure, and further comprises an aluminum top can 300 protruded from the upper surface of the battery cell A, and a finishing member C, which comprises lockers 216 and locker grooves 217.

The aluminum top can 300 is protruded a predetermined length from the upper surface of the battery cell A such that a PCM block B can be inserted into the top can 300. When the PCM block is inserted and mounted on the top can 300, the lockers 216 formed on both upper sides of an inner surface of a cap housing 202 are matched to the locker grooves 217 formed on both sides of the cap housing 202, thereby firmly fastening the PCM block B to the top can 300. Here, instead of the lockers 216 and the locker grooves 217, a clamper 218 as a finishing member may be protruded from the aluminum top can 300, so that when inserting the PCM block B into the top can 300, the protruded clamper 218 is bent into a clamper groove 202a formed as opening or indented area in the upper surface of the cap housing 202 to fix the PCM block to the top can 300. Additionally, the lockers may be formed on both sides of the cap housing 202, and the locker grooves may be formed on both upper sides of an inner surface of the aluminum top can 300. Thus, various fastening constructions may be applied to the present invention.

A process for assembling the modified battery cell type battery pack according to the second embodiment of the invention may comprise, for example, the steps of: inspecting the battery cell A; attaching an insulating sheet 208b or a bimetal block case guide 208a to the upper surface of the battery cell A by use of adhesives; spot welding a bimetal 205 to the anode nickel plate 204 of the PCM block B comprising the cap housing 202, the PCM assembly 203, the anode nickel plate 204 and the cathode nickel plate 207; spot welding the nickel plate 206 coupled to the bimetal 205 to an anode terminal of the battery cell A; fixing the PCM block B to the top can 300 by fixing the anode nickel plate 204 to the lockers 216 of the battery cell A with a bent portion of the anode nickel plate 204 folded at a right angle or by bending the protruded clamper 218, followed by injecting adhesives through the connecting hole 213 of the PCM block B; spot welding the cathode nickel plate 207 to the cathode terminal of the battery cell A through the connecting hole 213; inspecting electrical properties of a portion where the PCM block B and the battery cell A are joined to each other by spot welding; performing primary inspection of the appearance of the battery pack; attaching a lower cover 212 to the lower surface of the battery cell A by use of the double-sided tape attached to an inner surface of the lower cover 212; attaching a test point label 201 and a connecting hole cover 214 to the upper surface of the PCM block B; and performing final inspection of the appearance of the battery pack, followed by packaging.

Figure 20:
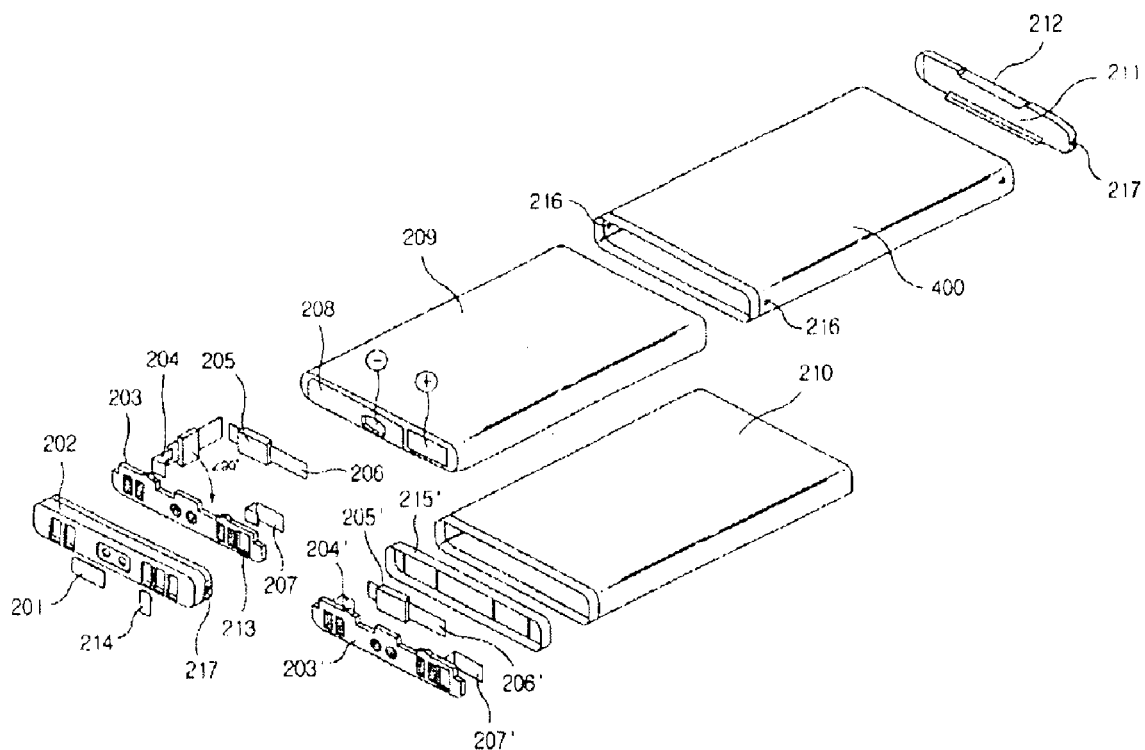
FIGS. 20 and 21 are perspective views of the case insertion type battery pack according to the third embodiment of the invention.
Figure 21:
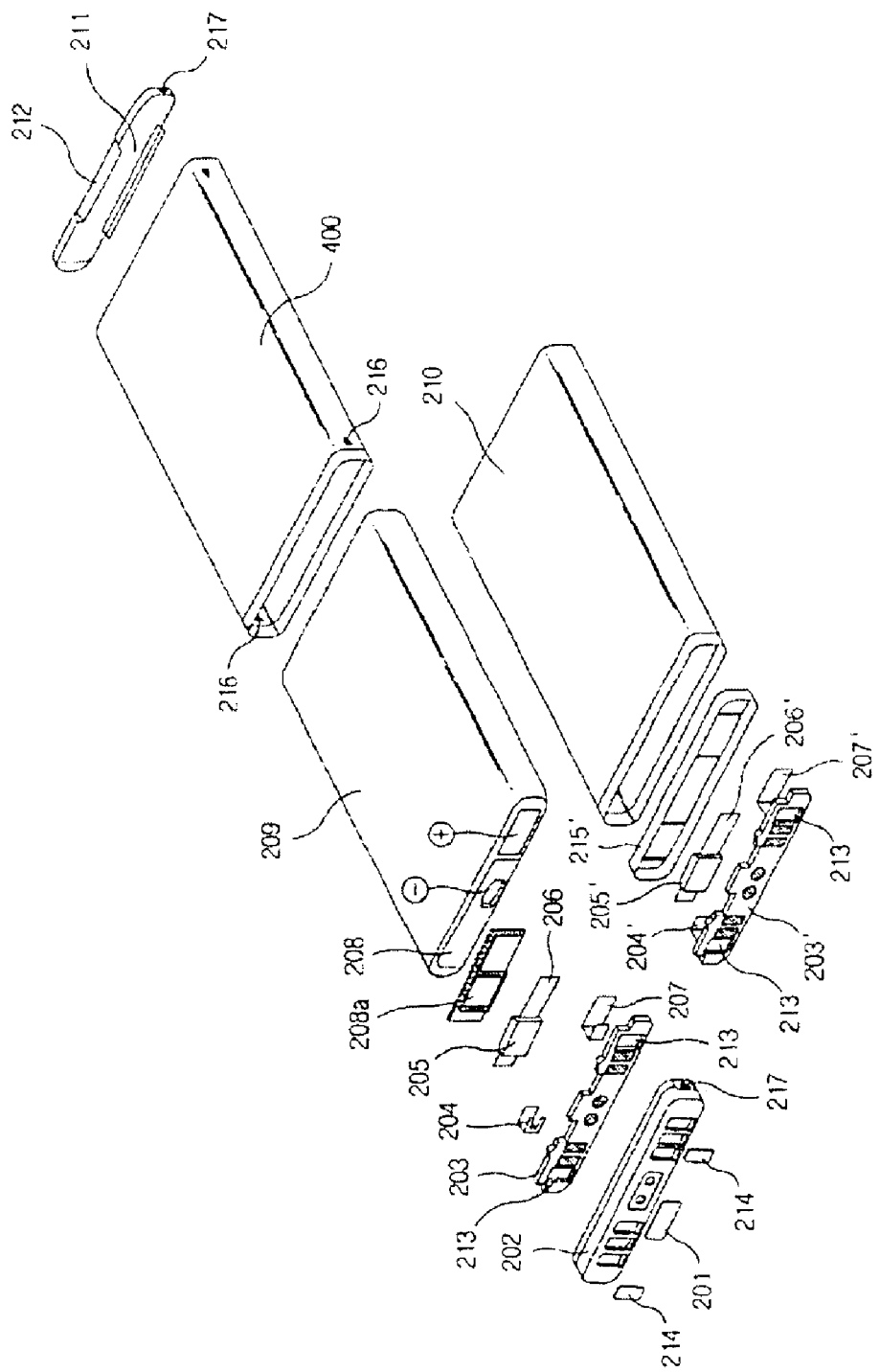

FIGS. 20 and 21 are perspective views of the case insertion type battery pack according to the third embodiment of the invention, in which FIG. 20 shows the internal battery pack having the one connecting hole 213, and FIG. 21 shows the internal battery pack having the two connecting holes 213.

According to the third embodiment, the battery pack comprises a case 400 enclosing a lithium ion cell 209 from the bottom surface to the upper surface while being extended a predetermined length from the upper surface of the lithium ion cell 209 so as to allow a PCM block B to be inserted into the case 400. That is, the battery according to the third embodiment is constructed in such a manner that, after the PCM block B is attached to the battery cell A, the PCM block B is pushed together with the battery cell A into the case 400.

In the battery pack according to the third embodiment, a finishing member C comprises locker grooves 217 formed on both sides of a cap housing 202 constituting the PCM block B and on both sides of a lower cover 212, and lockers 216 formed on both sides of upper and lower inner surfaces of the case 400 such that the lockers 216 are fastened to the locker grooves 217, respectively, when mounting the PCM block B and the lower cover 212.

A process for assembling the case insertion type battery pack according to the third embodiment of the invention may comprise, for example, the steps of: inspecting the battery cell A; attaching an insulating sheet 208b or a bimetal block case guide 208a to the upper surface of the battery cell A by use of adhesives; spot welding the bimetal 205 to the anode nickel plate 204 of the PCM block B comprising the cap housing 202, a PCM assembly 203, an anode nickel plate 204 and a cathode nickel plate 207; spot welding the nickel plate 206 coupled to a bimetal 205 to an anode terminal of the battery cell A; seating the anode nickel plate 204 to the battery cell A with a bent portion of the anode nickel plate 204 folded at the right angle, followed by injecting the adhesives through the connecting hole 213 of the PCM block B; spot welding the cathode nickel plate 207 to the cathode terminal of the battery cell A through the connecting hole 213; inspecting electrical properties of a portion where the PCM block B and the battery cell A are joined to each other by spot welding; performing primary inspection of the appearance of the battery pack; pushing the PCM block into the case 400 to penetrate the case enclosing the battery cell A, followed by fixing the PCM block by use of the lockers 216 formed on both sides of the inner surface of the case and attaching the lower cover 212 to the lockers 216 of the lower surface of the case 400 by use of the double-sided tape attached to an inner surface of the lower cover 212; attaching a test point label 201 and a connecting hole cover 214 to the upper surface of the PCM block B; and performing final inspection of the appearance of the battery pack, followed by packaging.

Figure 23:
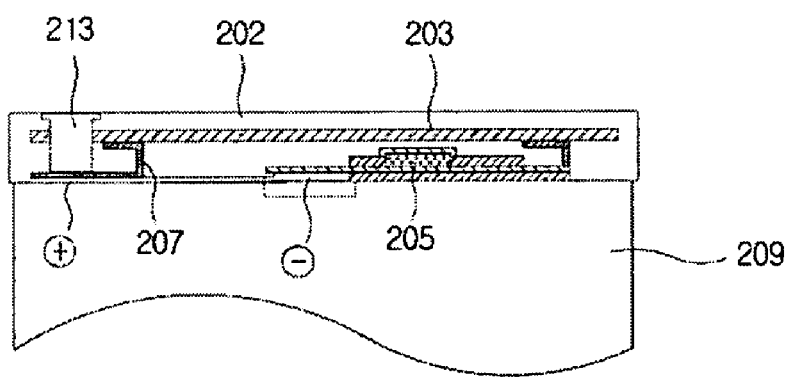
Figure 24:
Figure 25:
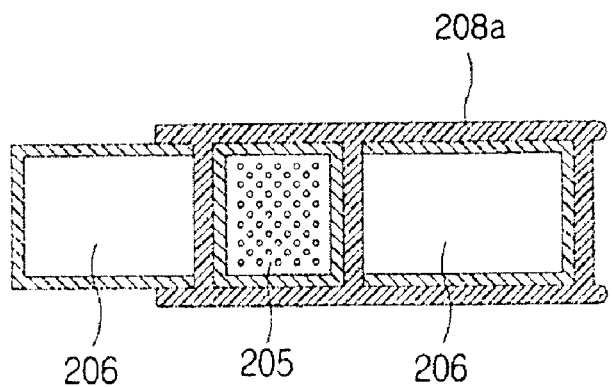

FIGS. 22 to 26 are diagrams illustrating an exemplary construction of the cap housing having one connecting hole. FIG. 22 is a transverse cross-sectional view of the battery pack upon partial insert molding, FIG. 23 is a transverse cross-sectional view of the battery pack upon overall insert molding, FIGS. 24 and 25 show the constructions of the cathode nickel plate 207, the anode nickel plate 204, and the bimetal block D interposed between the battery cell A and the PCM assembly 203 upon insert molding, and FIG. 26 shows the connecting hole 213 and the bond line grooves 215 as seen from the bottom of the PCM guide 215.

As for a molding process for forming the cap housing 202, the partial insert molding process or the overall insert molding process may be selectively employed. In FIG. 22, the partial insert molding process is shown, when the number of connecting holes is one.

Referring to FIG. 22, the L-shaped or Z-shaped cathode and anode nickel plates 207 and 204 are soldered in the SMD type to the PCM assembly 203, which is the protective circuit board. The partial insert molding process is a process of partially encasing the PCM block B up to the PCM assembly 203 with the resin (more specifically, partially encasing the PCM block B up to the front surface of the PCM assembly 203 with the resin), and requires the PCM guide 215 between the PCM block B and the battery cell A. At this time, the constructions of the cathode and anode plates 207 and 204 may be varied, as shown in FIG. 24, according the position thereof. Meanwhile, as shown in FIG. 25, the bimetal block D comprises the bimetal 205, the nickel plate 206 joined to the bimetal 205 by spot welding, and the plastic bimetal block case guide 208a coupled to the nickel plate 206 and the bimetal 205.

FIG. 26 shows the connecting hole 213 and the bond line grooves 215 as seen from the bottom of the cap housing 202. When the adhesives are injected through the connecting hole 213 in order to steadily bond the battery cell A and the cap housing 202 after joining the cathode nickel plate 207 to the battery cell through spot welding, the bond line grooves 215a act as a path of the adhesives, so that the adhesives flow along the bond line grooves 215a, thereby preventing the adhesives from being leaked. Additionally, the constructions of the PCM assembly 203, the cathode and anode nickel plates 207 and 204, and the bond line grooves 215a may be modified according to the number of connecting holes 213 in the cap housing (see FIGS. 12 to 15).

Figure 28:
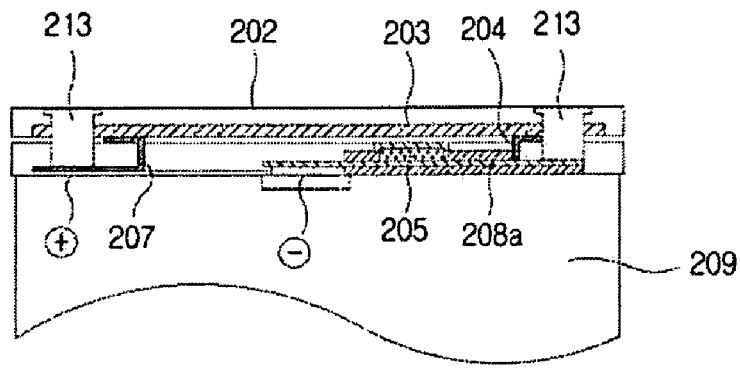
Figure 29:
Figure 30:
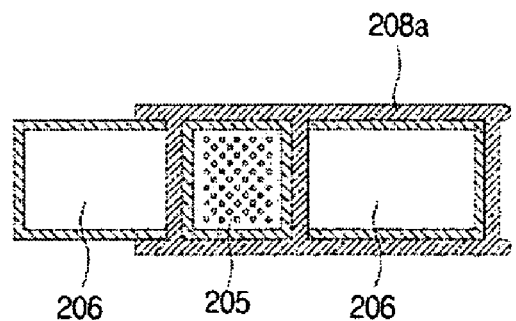
Figure 31:
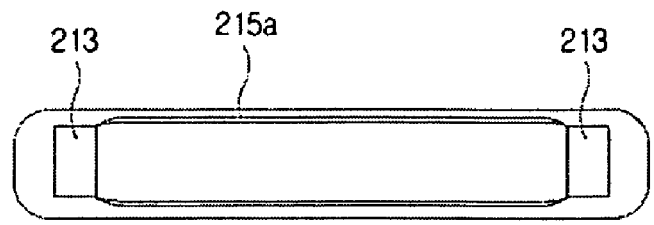

FIGS. 27 to 30 are diagrams illustrating an exemplary PCM insertion molding construction when the number of connecting holes is two. More specifically, FIG. 27 is a transverse cross-sectional view of the battery pack upon partial insert molding, FIG. 28 is a transverse cross-sectional view of the battery pack upon overall insert molding, FIGS. 29 and 30 show the constructions of the cathode nickel plate 207, the anode nickel plate 204, and the bimetal block D interposed between the battery cell A and the PCM assembly 203 upon insert molding, and FIG. 31 shows the connecting hole 213 and the bond line grooves 215 as seen from the bottom of the PCM guide 215.

Referring to FIG. 27, the L-shaped, C-shaped or Z-shaped cathode and anode nickel plates 207 and 204 are soldered in the SMD type to the PCM assembly 203, which is the protective circuit board. The overall insert molding process is a process of encasing the PCM block B up to the nickel plate 206 with a resin (that is, entirely encasing the PCM block B including the protective circuit module and connection terminals formed on the rear side of the PCM assembly 203 up to the upper surface of the battery cell A where the bimetal 205 and the nickel plate 206 are coupled), and does not requires the PCM guide 215 between the PCM block B and the battery cell A.

FIGS. 28 to 31 are similar to FIGS. 23 to 26 except for the number of connecting holes 213, and thus the detailed description thereof will be omitted.

INDUSTRIAL APPLICABILITY

As apparent from the above description, the battery pack of the invention is lighter, compacter and miniaturized, thereby allowing an electronic device employing the battery pack to be reduced in overall size, enhancing workability through a simplified assembling process, reducing manufacturing costs through reduction of the number of components, and enhancing productivity through reduction of the number of operating steps by eliminating additional installation steps.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack comprising: a battery cell having cathode and anode terminals formed on the upper surface thereof to supply a rated operating voltage;

a protective circuit module (PCM) block comprising (i) a PCM assembly electrically to be connected to the battery cell, in which the PCM assembly includes a rectangular printed circuit board (PCB) having a size approximately the same as that of the upper surface of the battery cell, and a protective circuit module formed on the PCB to provide a function of preventing overcharge, over-discharge and over-current of the battery cell, (ii) a cap housing formed by injection molding to hold the PCM assembly, and (iii) cathode and anode nickel plates attached to a lower surface of the PCM assembly to provide the electrically connected portion between the battery cell and the PCM block;

a first connecting hole perforated through the cap housing and a second connecting hole perforated through the printed circuit board, the first and second connecting holes being aligned with each other in such a way that the cathode nickel plate is exposed to the outside of the battery pack through the first and second connecting holes to enable a welding pin to reach the cathode nickel plate; and an insulating member to be inserted into or attached to the connection hole after the welding wherein the cap housing is partially molded within a resin by partially encasing the PCM block to a front side of the PCM assembly with the resin, and, the PCM block further comprising; a clad metal PCM guide inserted and fixed between the PCM assembly and the battery cell in order to prevent the PCM assembly from being pushed in a direction of the battery cell upon resin molding, wherein the PCM guide is formed with bond line grooves spaced a predetermined distance from each other from an outer line thereof for injecting adhesives upon fixing.

2. The battery pack as set forth in claim 1, wherein the battery cell is a lithium ion secondary cell.

3. The battery pack as set forth in claim 1, wherein the battery pack is an internal battery pack.

4. The battery pack as set forth in claim 1, wherein the battery pack is detachably mounted into a mobile telecommunication terminal and supplies the rated operating voltage to the telecommunication terminal, the battery pack further comprising:

a finishing member for securing air-tightness between inner structures of the battery pack by firmly fixing the battery cell and the PCM block while allowing easy coupling between the battery cell and the PCM block.

5. The battery pack as set forth in claim 4, wherein the finishing member comprises: a test point label attached to one side of the PCM block; a lower cover for covering a lower surface of the battery cell; a double-sided tape attached to an inner surface of the lower cover; a connecting hole cover for covering the connecting hole; and a wrap label for wrapping an outer periphery of the battery cell.

6. The battery pack as set forth in claim 4, wherein the battery cell is a top can cell comprising an aluminum top can protruded a predetermined length from the upper surface of the battery cell such that the PCM block is inserted into the top can, and the finishing member comprises locker grooves formed on both sides of the cap housing and lockers as a projection that locks to a mating surface formed on both upper sides of an inner surface of the aluminum top can so as to be matched to the locker grooves upon inserting the PCM block into the top can.

7. The battery pack as set forth in claim 4, wherein the battery cell is a top can cell comprising an aluminum top can protruded a predetermined length from the upper surface of the battery cell such that the PCM block is inserted into the top can, and the finishing member comprises a clamper protruded from the aluminum top can so as to be bent into a clamper groove formed as an opening or indented area in the upper surface of the cap housing to fix the PCM block upon inserting the PCM block into the top can.

8. The battery pack as set forth in claim 4, wherein the battery cell comprises a case enclosing the battery cell from the bottom surface to the upper surface while being extended a predetermined length from the upper surface of the battery cell so as to allow the PCM block to be inserted into the case in such a manner that, after the PCM block is attached to the battery cell, the PCM block is pushed together with the battery cell into the case, and the finishing member comprises locker grooves formed on both sides of a PCM insertion molding portion constituting the PCM block and on both sides of the lower cover, and lockers as a projection that locks to a mating surface formed on both sides of upper and lower inner surfaces of the case such that the lockers are fastened to the locker grooves, respectively, when mounting the PCM block and the lower cover.

9. The battery pack as set forth in claim 1, wherein the cathode terminal is an aluminum-nickel clad plate joined to upper side of an external can made of aluminum and the anode terminal is a protruded terminal, the battery cell further comprising an insulating sheet or a bimetal block case guide bonded around the cathode and anode terminals for electrical insulation from the external can.

10. The battery pack as set forth in claim 1, further comprising: a third connecting hole perforated through the cap housing and a fourth connecting hole perforated through the PCM assembly including the printed circuit board and the protective circuit module, the third and fourth connecting holes being aligned with each other in such a way that the anode nickel plate is exposed to the outside of the battery pack through the third and fourth connecting holes to enable a welding pin to reach the anode nickel plate.

* * * * *